(12) United States Patent
Dederer et al.

(10) Patent No.: US 9,275,767 B2
(45) Date of Patent: Mar. 1, 2016

(54) SYSTEMS AND METHODS FOR GENERATING POWER EMPLOYING VES AIR SUPPLY STORED ENERGY

(71) Applicant: WESTINGHOUSE ELECTRIC COMPANY LLC, Cranberry Township, PA (US)

(72) Inventors: Jeffrey T. Dederer, Valencia, PA (US); David Repp, Atlanta, GA (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 755 days.

(21) Appl. No.: 13/760,165

(22) Filed: Feb. 6, 2013

(65) Prior Publication Data
US 2014/0216021 A1    Aug. 7, 2014

(51) Int. Cl.
G21D 1/02    (2006.01)
G21D 1/00    (2006.01)

(52) U.S. Cl.
CPC .. *G21D 1/02* (2013.01); *G21D 1/00* (2013.01); *Y02E 30/40* (2013.01)

(58) Field of Classification Search
CPC ............. G21C 15/00; F24F 7/00; F25D 9/00; F02G 1/00; B60L 11/14; F16D 31/00
USPC .................................................... 60/403, 404
See application file for complete search history.

(56) References Cited

U.S. PATENT DOCUMENTS

| | | | |
|---|---|---|---|
| 4,435,194 A * | 3/1984 | Picard et al. | 95/19 |
| 4,995,892 A * | 2/1991 | Garrett et al. | 65/379 |
| 5,108,695 A | 4/1992 | Schulz | |
| 7,819,935 B2 * | 10/2010 | Austin et al. | 55/385.2 |
| 2006/0059936 A1 | 3/2006 | Radke et al. | |
| 2006/0207681 A1* | 9/2006 | Purington | 141/231 |
| 2009/0266069 A1 | 10/2009 | Domes | |
| 2010/0024445 A1* | 2/2010 | Cichanowicz | 62/86 |
| 2011/0217917 A1 | 9/2011 | Sulva | |
| 2013/0005237 A1 | 1/2013 | Baten et al. | |

OTHER PUBLICATIONS

International Search Report and Written Opinion of the International Searching Authority for PCT/US2013/076360 dated Apr. 9, 2014 (Forms PCT/ISA/210, PCT/ISA/237).

* cited by examiner

*Primary Examiner* — Thomas E Lazo
(74) *Attorney, Agent, or Firm* — Joseph C. Spadacene; Westinghouse Electric Company LLC

(57) ABSTRACT

The present invention relates to a generation system for converting compressed air in a passive main control room habitability system to energy when the main control room habitability system is activated during an accident scenario in a nuclear reactor power plant. The system includes a pressure regulator for reducing the pressure of the compressed air to produce reduced pressurized air, an eductor to deliver air to the control room, and piping to connect the tank to the pressure regulator and the eductor to allow the flow of compressed air therein. The generation system includes a mechanism positioned upstream of the eductor for receiving the reduced pressurized air from the pressure regulator and converting at least a portion of said reduced pressurized air into energy.

12 Claims, 3 Drawing Sheets

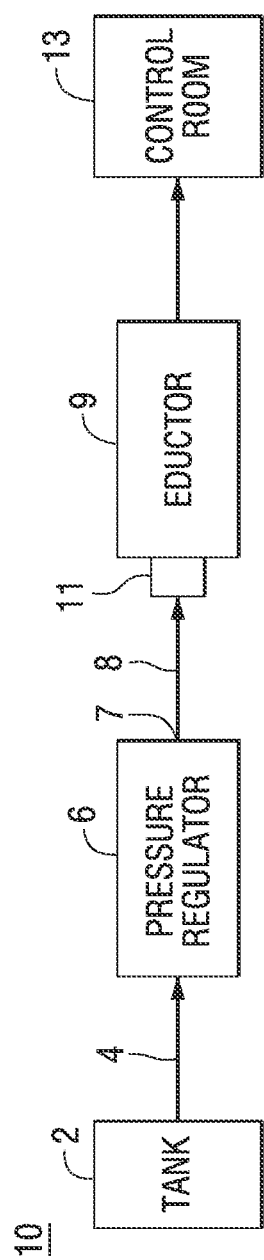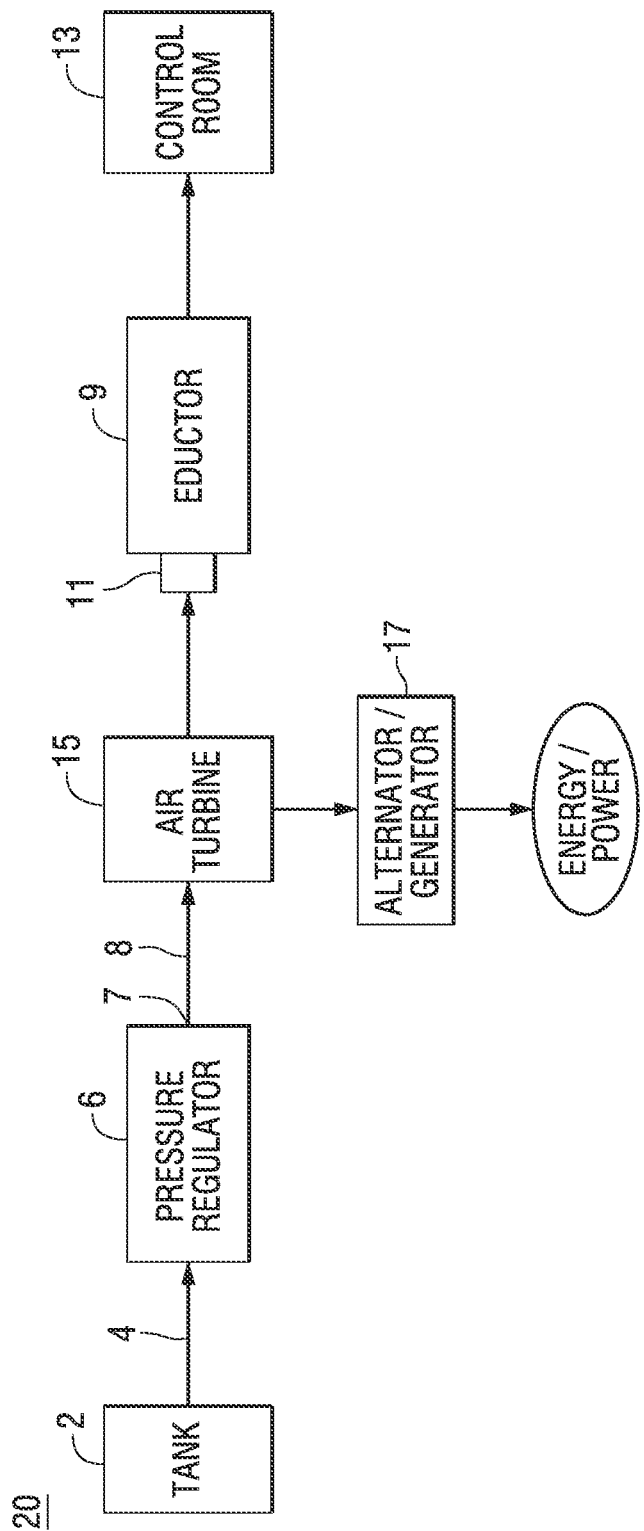

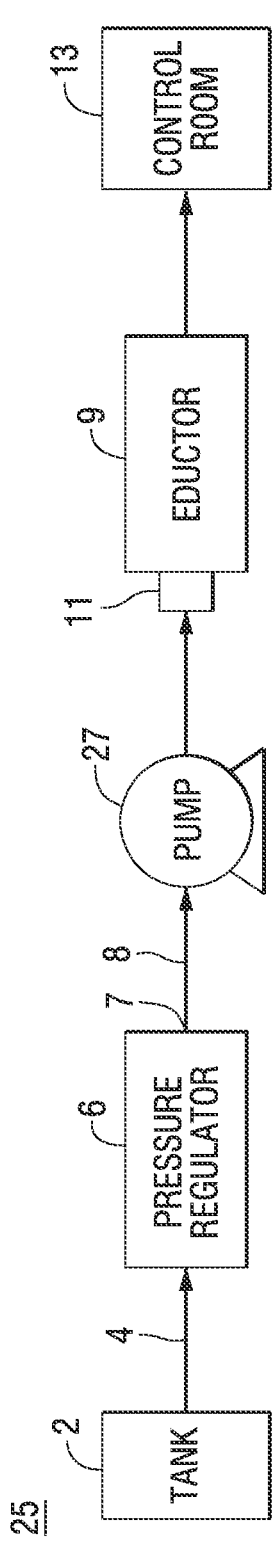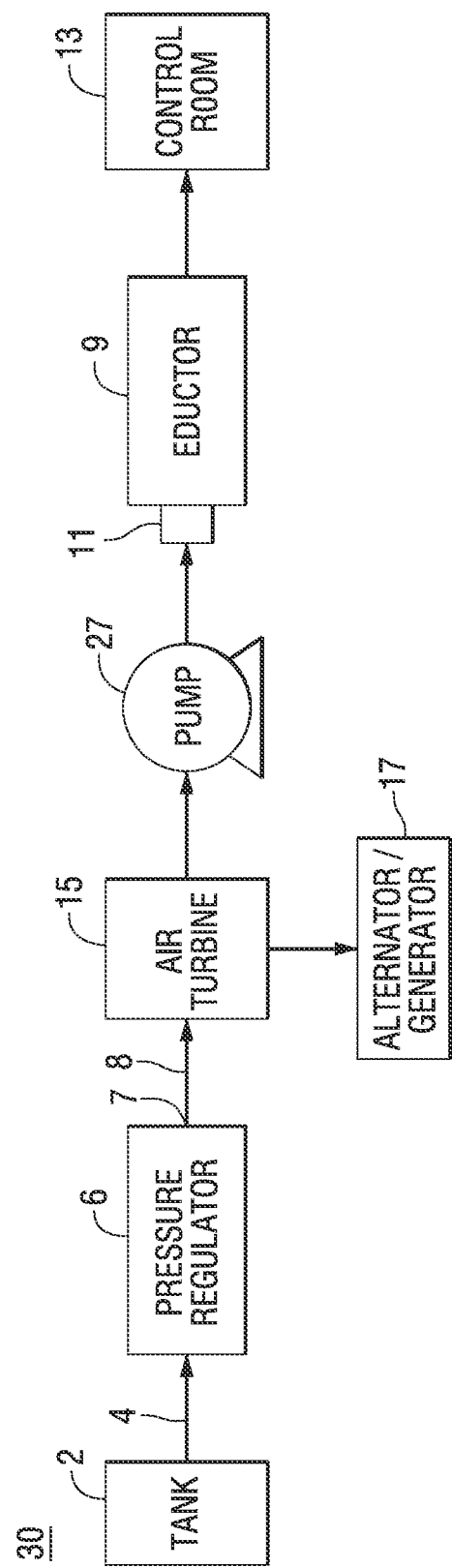

SYSTEMS AND METHODS FOR GENERATING POWER EMPLOYING VES AIR SUPPLY STORED ENERGY

FIELD OF THE INVENTION

The invention relates generally to systems and methods for power generation using stored energy from a passively powered Main Control Room Habitability System (VES) following an accident or event involving a loss of all AC power.

BACKGROUND

Various functions for generating electric power in a nuclear reactor power plant require two critical resources, i.e., water and power. For example, water is used for cooling the fuel inside of the reactor and the spent fuel pool, and power is employed for a variety of plant functions including pumping, valve actuations, instrumentation and plant monitoring. During an accident scenario, such as station blackout, or other event resulting in the loss of all AC power, it may be difficult to obtain and provide external resources to the nuclear plant site to cope with the accident. Therefore, it is beneficial for the plant site to have alternate means to produce power and provide cooling water during a loss of AC power scenario.

In general, the Main Control Room Habitability System (VES) in a nuclear reactor power plant is a passively powered system which uses air to provide ventilation, cooling and filtration of the control room's environment following an accident or other event involving a loss of all AC power. FIG. 1 shows schematically a VES system 10 in accordance with the prior art. Compressed air is stored in tank 2 and pressurized. Typically, air is stored at a maximum pressure of 4000 psi. A minimum pressure of the tank is 3333 psi, with air at 60° F. under normal conditions. Further, it is typical for VES systems to employ more than one tank to store the compressed air. For example, in some commercial nuclear reactor power plants, such as the Westinghouse AP1000 plant, 32 tanks are used with each tank having a free volume of about 46.1 ft$^3$. A stream of compressed air 4 is passed from the tank 2 through a pressure regulator 6. The minimum inlet pressure of the pressure regulator 6 is 200 psi. The pressure regulator 6 reduces the pressure of the stream of compressed air 4 such that a stream of lower pressure compressed air 8, which has a volumetric flow rate of 65 SCFM, passes through the outlet 7, is fed to an eductor nozzle 11 and is used to power an eductor 9. The air pressure at the outlet 7 is reduced to an intermediate pressure. For the AP1000 plant, the intermediate pressure, i.e., the pressure of the stream of lower pressure compressed air 8, is 120 psi. The flow fed to the eductor nozzle 11 provides fresh air for the control room and the eductor 9 provides for a circulation of airflow within the control room space 13.

For the AP1000, the compressed air stored in a nuclear reactor power plant is sufficient to provide 65±5 SCFM to the main control room area for at least 72 hours following an accident or other event involving a loss of all AC power. This compressed air represents a significant amount of potential energy.

It is known in the art to employ various passively powered designs, such as the VES, to mitigate accident events in a nuclear reactor without operator intervention or off-site power. These passively powered designs emphasize safety features that rely on natural forces, such as pressurized gas, gravity flow, natural circulation flow, and convection, and do not rely on active components (such as, pumps, fans or diesel generators). Further, passive systems are designed to function without safety grade support systems (such as, AC power, component cooling water, service water, and HVAC).

It is desired to develop further passive features and mitigation strategies for use in nuclear reactor power plants. For example, it is desired to recover energy from nuclear plant processes for use during accident and other event sequences when resources may not be readily available. Accordingly, this invention provides systems and methods for extracting significant useful energy from the compressed air in the VES. This energy may be employed in the nuclear plant to cope with accident and other loss of AC power event sequences wherein the VES is activated.

SUMMARY OF THE INVENTION

In one aspect, the invention provides a generation system for converting compressed air in a passive main control room habitability system to energy when the main control room habitability system is activated during a scenario involving the loss of all AC power in a nuclear reactor power plant. The main control room habitability system includes at least one tank for storing compressed air; a pressure regulator, having an inlet and an outlet, for reducing the pressure of the compressed air to produce from the pressure regulator outlet a stream of lower pressure compressed air; an eductor, having an eductor nozzle, to deliver the compressed air to the control room; and piping to connect the tank to the pressure regulator and the eductor to allow the flow of compressed air therein. The generation system includes a mechanism positioned upstream of the eductor for receiving the stream of lower pressure compressed air from the outlet of the pressure regulator and converting said stream of lower pressure compressed air into energy.

The mechanism can include a turbine having an inlet and an exhaust, and a generator. In a further embodiment, the mechanism can include an air-driven pump.

The maximum pressure of the compressed air in the at least one tank can be about 4000 psi. The minimum pressure in the at least one tank can be about 3333 psi. The stream of lower pressure compressed air can have a pressure of about 120 psi.

A pressure differential of 25 psi between the exhaust of the turbine and the inlet of the eductor can be used to operate the air-driven pump.

In another aspect, the invention provides a method of generating energy by recovering compressed air in an activated, passive main control room habitability system in a nuclear reactor power plant. The method includes pressurizing compressed air in at least one storage tank; passing the compressed air through a pressure regulator to produce a stream of lower pressure compressed air; delivering the stream of lower pressure compressed air to a mechanism for converting the stream of lower pressure compressed air into energy.

The mechanism can include a turbine, having an inlet and an exhaust, and a generator. In a further embodiment, the mechanism can include an air-driven pump.

BRIEF DESCRIPTION OF THE DRAWINGS

FIG. 1 shows a schematic of a Main Control Room Habitability System (VES) in accordance with the prior art.

FIG. 2 shows a schematic of a VES power generation system wherein the mechanism includes a turbine-generator, in accordance with certain embodiments of the invention.

FIG. 3 shows a schematic of another VES power generation system wherein the mechanism includes an air-driven pump, in accordance with certain embodiments of the invention.

FIG. 4 shows a schematic of another VES power generation system wherein the mechanism includes a turbine-generator and an air-driven pump, in accordance with certain embodiments of the invention.

DETAILED DESCRIPTION OF THE INVENTION

Figure 5:
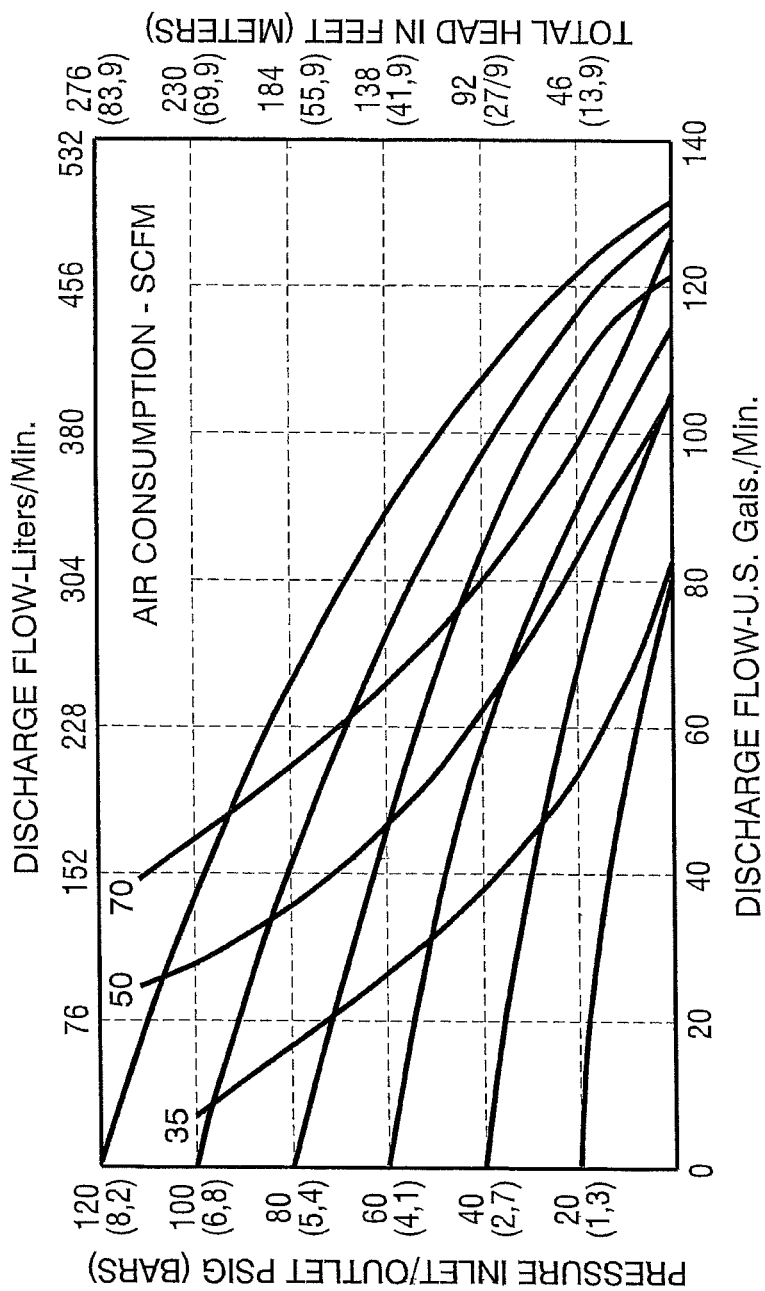
FIG. 5 shows a pump curve for a pneumatic pump for use in the VES as shown in FIGS. 3 and 4, in accordance with certain embodiments of the invention.

The invention relates to systems and methods for extracting energy and generating power from compressed air in a passively powered Main Control Room Habitability System (VES) in a nuclear reactor power plant, such as a pressurized water reactors and boiling water reactors, during a coping scenario, such as an accident or other event which involves the loss of all AC power, when the VES is activated. In particular, the power generation systems and methods of the invention extract energy from the pressure differential of the compressed air, from the initial pressure (i.e., in a compressed air tank) to a pressure at the inlet of an eductor. This stored energy is converted into useful power, for example, by a turbine and/or pump. Further, the compressed air (at a lower pressure) is available to pass through the eductor and into the control room of the nuclear reactor power plant. The VES generally supplies compressed air for the ventilation, cooling and filtration of the control room environment during a coping scenario. Thus, the invention is useful for converting stored energy in the compressed air inventory of the VES into useful energy to lengthen the ability of the plant to cope following an accident with extended loss of AC power.

FIG. 2 shows schematically a VES power generation system 20 in accordance with certain embodiments of the invention. FIG. 2 includes the tank 2, stream of compressed air 4, pressure regulator 6, outlet 7, stream of lower pressure compressed air 8, eductor 9, eductor nozzle 11 and control room 13 as shown in FIG. 1. As previously indicated, the pressure regulator 6 reduces the pressure of the incoming stream of compressed air 4 such that the stream of lower pressure compressed air 8 passes through the outlet 7. In addition, FIG. 2 includes an air turbine 15 and an alternator/generator 17. These two components are provided upstream of the eductor 9 and eductor nozzle 11. The stream of lower pressure compressed air 8 exits the pressure regulator outlet 7 and is fed into the air turbine 15 and alternator/generator 17 to convert stored energy in the compressed air into useful energy, e.g., power, which can be used for coping functions during an accident scenario in a nuclear reactor power plant when the VES is activated. The lower pressure compressed air 8 has a pressure that is essentially equal to that required by the air turbine 15. The recovery and conversion of the stored energy to useful energy in the VES is accomplished while meeting the design requirements of the VES. The pressure of the compressed air can vary. In certain embodiments, the compressed air is initially at a pressure of about 3333 psig, e.g., in the tank 2. The air is adiabatically and isentropically expanded from this initial pressure to a final pressure of about 200 psig. This expansion occurs through the air turbine 15 and therefore, the pressure of about 200 psig is downstream of the air turbine 15. In certain embodiments, a secondary pressure regulator (not shown) may be employed to further reduce the pressure to that required by the eductor 9 or other component positioned downstream of the air turbine 15, such as an air-driven pump (as shown in FIG. 3). In certain embodiments, the secondary pressure regulator (not shown) may be positioned between the air turbine 15 and the eductor nozzle 11. The available energy is estimated by multiplying the difference in enthalpy of the initial and final pressure states by the mass of air that is expanded. The details of this conversion are later provided herein. This energy can be used during the coping period of an accident scenario for a variety of useful functions, such as, but not limited to, charging batteries or powering instrumentation and other equipment.

The invention also includes the VES power generation system 25 shown schematically in FIG. 3, in accordance with certain embodiments. FIG. 3 includes the tank 2, stream of compressed air 4, pressure regulator 6, outlet 7, stream of lower pressure compressed air 8, eductor 9, eductor nozzle 11 and control room 13 as shown in FIG. 1. In addition, FIG. 3 includes an air-driven pump 27 positioned downstream of the pressure regulator 6 and its outlet 7, and upstream of the eductor 9 and its nozzle 11. In this embodiment, the pressure regulator 6 is set to deliver the inlet pressure required by the air-driven pump 27 (instead of the air turbine 15 as shown in FIG. 1).

The invention further includes the VES power generation system 30 shown schematically in FIG. 4, in accordance with certain embodiments. FIG. 4 includes the tank 2, stream of compressed air 4, pressure regulator 6, outlet 7, stream of lower pressure compressed air 8, eductor 9, eductor nozzle 11 and control room 13 as shown in FIG. 1. In addition, FIG. 4 includes the air turbine 15, the alternator/generator 17 and the air-driven pump 27. The air-driven pump 27 is positioned downstream of the air turbine 15 and, upstream of the eductor 9 and its nozzle 11. In this embodiment, the system will be configured such that either the air turbine 15 exhausts at a pressure that matches the required inlet pressure of the air-driven pump 27, or a secondary pressure regulator (not shown) may be installed between the air turbine 15 and the air-driven pump 27 such that the appropriate inlet pressure to the air-driven pump 27 is achieved.

In certain embodiments, the pressure regulator 6 is set to provide a pressure of 120 psig at its outlet 7 and the eductor nozzle 11/eductor 9 is designed to operate at 110 psig. In other embodiments, the pressure regulator 6 is set at a significantly higher pressure corresponding to the design/inlet pressure of the air turbine, and the turbine exhaust is at the design/inlet pressure of the air-driven pump. It is understood that additional pressure regulating devices may be included as needed to produce the desired inlet pressures to the air turbine, air-driven pump or eductor. Changing the setting of the pressure regulator 6 to a slightly higher pressure of about 135 psig, for example, and maintaining the inlet pressure to the eductor at 110 psig, provides a 25 psi pressure differential to operate the air-driven pump. This pump can be used, for example, to transport water from on-site storage tanks to locations where it is needed for coping during an accident scenario.

EXAMPLES

The following examples apply to AP1000 plants designed by Westinghouse Electric Company.

Example 1

The stored energy of any substance is equal to the total enthalpy of that substance. The total useful energy is the difference between the enthalpy before performing work and the enthalpy at the final condition. For the VES air storage tanks, the initial pressure of the compressed air is a function of the ambient conditions in the air storage tank room.

In this example, the calculated tank pressure at ambient temperatures of 60 and 80° F. was determined to be 3333 and 3504 psig, respectively. The pressure of the air at the inlet of the eductor was determined to be 110 psig.

The total energy in the stored air was obtained from:

$$E = m_{air} * h_1 \quad \text{(Equation 1)}$$

wherein E is the stored energy in the tank, $m_{air}$ is the mass of the air in the tank, and $h_1$ is the enthalpy of the air in the tank. $h_1$ was determined from thermodynamic tables, and the total mass of air in the tanks was found using Equation 2, which relates the specific volume and the total storage volume to the total mass of air:

$$m_{air} = \frac{V}{v_{air}} \quad \text{(Equation 2)}$$

wherein $v_{air}$ is the specific volume of air at the system temperature and pressure and V is the total storage volume of the air tanks.

Not all of the energy stored in the tanks was extracted and turned into useful work. The overall energy balance of any system is shown as Equation 3:

$$\Delta H + \frac{\Delta u^2}{2g_c} + g\Delta z = Q + W_s \quad \text{(Equation 3)}$$

Equation 3 governs the total energy transfer from any system, wherein $$\frac{\Delta u^2}{2g_c}$$

is the change in kinetic energy, $g\Delta z$ is the change in the potential energy, $\Delta H$ is the change in the system enthalpy, Q is heat and $W_s$ is the work. Wherein the kinetic and potential energy of the system was negligible compared to the change in enthalpy, and wherein the system was assumed to be adiabatic (no heat transferred into or out of the system), Equation 3 was simplified to:

$$H_1 - H_2 = W_s \quad \text{(Equation 4)}$$

The final enthalpy, $H_2$, was not readily known but the final pressure was known and it was assumed that the system was completely reversible (isentropic). The final enthalpy was determined by interpolating the thermodynamic table for compressed air. Isentropic expansion uses the assumption that entropy is constant, i.e. $S_1 = S_2$.

Assumptions:
1. The kinetic and potential energy of the system was negligible.
2. The system was adiabatic.
3. The system was isentropic.
4. Expansion from tank pressure to the minimum inlet pressure regulator did not affect overall system performance criteria.
5. Electricity Generation efficiency of 33% for compressed air turbine.

Input:
Design pressure of compressed air tanks=4000 psig
Design temperature of compressed air tanks=60-80° F.
Total number of compressed air tanks=32
Total free volume of each compressed air tank=46.1 ft³
Minimum Inlet Pressure Regulator Setpoint=200 psig
Eductor Inlet pressure=110 psig
Minimum Pressure of Tanks at 60° F.=3333 psig
Minimum Pressure of Tanks at 80° F.=3504 psig
Specific Volume of Air at 68° F. and 200 bar=0.00433 m³/kg
Determined Mass of Air Inside Compressed Air Tanks

TABLE 1

| Pressure | 280 K | 300 K |
|---|---|---|
| 200 bar | Enthalpy = 239.6 kJ/kg<br>Entropy = 5.149 kJ (kg * K)<br>Specific Volume = 0.00407 m³/kg | Enthalpy = 265.5 kJ/kg<br>Entropy = 5.238 kJ/(kg * K)<br>Specific Volume = 0.00446 m³/kg |
| 250 bar | Enthalpy = 234.3 kJ/kg<br>Entropy = 5.064 kJ/(kg * K)<br>Specific Volume = 0.00338 m³/kg | Enthalpy = 260.8 kJ/kg<br>Entropy = 5.155 kJ/(kg * K)<br>Specific Volume = 0.00368 m³/kg |

Temperature of air was 60° F.=288.7 K
Initial Pressure of air was 3333 psig=3347.4 psia=230.8 bar Interpolating between the table values:

Enthalpy

Enthalpy at 288.7 K and 200 Bar =

$$239.6 + \left[\frac{(288.7 - 280)}{300 - 280} * (265.5 - 239.6)\right] = 250.9 \frac{kJ}{kg}$$

Enthalpy at 288.7 K and 250 Bar =

$$234.3 + \left[\frac{(288.7 - 280)}{300 - 280} * (260.8 - 234.3)\right] = 245.8 \frac{kJ}{kg}$$

Enthalpy at 288.7 K and 230.8 Bar =

$$250.9 + \left[\frac{(230.8 - 200)}{250 - 200} * (245.8 - 250.9)\right] = 247.8 \frac{kJ}{kg}$$

Entropy

Entropy at 288.7 K and 200 Bar =

$$5.149 + \left[\frac{(288.7 - 280)}{300 - 280} * (5.238 - 5.149)\right] = 5.188 \frac{kJ}{kg * K}$$

Entropy at 288.7 K and 250 Bar =

$$5.064 + \left[\frac{(288.7 - 280)}{300 - 280} * (5.155 - 5.064)\right] = 5.104 \frac{kJ}{kg * K}$$

Entropy at 288.7 K and 230.8 Bar =

$$5.188 + \left[\frac{(230.8 - 200)}{250 - 200} * (5.104 - 5.188)\right] = 5.136 \frac{kJ}{kg * K}$$

Specific Volume

Specific Volume at 288.7 K and 200 Bar =

$$0.00407 + \left[\frac{(288.7 - 280)}{300 - 280} * (0.00446 - 0.00407)\right] = 0.00424 \frac{m^3}{kg}$$

Specific Volume at 288.7 K and 250 Bar =

$$0.00338 + \left[\frac{(288.7 - 280)}{300 - 280} * (0.00368 - 0.00338)\right] = 0.00351 \frac{m^3}{kg}$$

-continued

Specific Volume at 288.7 K and 230.8 Bar =

$$0.00351 + \left[\frac{(230.8 - 200)}{250 - 200} * (0.00424 - 0.00351)\right] = 0.00396 \frac{m^3}{kg}$$

Calculated Mass of Compressed Air in VES Storage Tanks
Volume of tank=46.1 ft³=1.305 m³
Total Volume of Compressed Air Tanks=1.305*32=41.76 m³

$$m_{air} = \frac{V}{v_{air}}$$

$$m_{air} = \frac{41.76 \text{ m}^3}{0.00396 \frac{m^3}{kg}} = 10545.45 \text{ kg}$$

Initial Stored Energy in Compressed Air Tanks $$E = m_{air} * h_1$$

$$h_1 = 247.8 \frac{kJ}{kg}$$

$$E = 10545.45 \text{ kg} * 247.8 \frac{kJ}{kg} = 2613.2 \text{ MJ}$$

Final Enthalpy Assuming Isentropic Expansion

The pressure regulating valve had a minimum inlet pressure of 200 psig (214.7 psia), and it was a reasonable assumption that if the compressed air was expanded to 200 psig, the VES system performance was not affected.

214.7 psia=14.8 bar

TABLE 2

| Pressure | 120 K | 140 K |
| --- | --- | --- |
| 10 bar | Enthalpy = 106.2 kJ/kg<br>Entropy = 5.214 kJ/(kg * K) | Enthalpy = 130.2 kJ/kg<br>Entropy = 5.398 kJ/(kg * K) |
| 20 bar | Enthalpy = 85.2 kJ/kg<br>Entropy = 4.882 kJ/(kg * K) | Enthalpy = 118.5 kJ/kg<br>Entropy = 5.140 kJ/(kg * K) |

Interpolated Between Points to Find Enthalpy at 214.7 Psia and Entropy of 5.136

Enthalpy at 214.7 psia (14.8 bar) and 120 K =

$$106.2 + \left[\frac{(14.8 - 10)}{20 - 10} * (85.2 - 106.2)\right] = 96.1 \frac{kJ}{kg}$$

Enthalpy at 214.7 psia (14.8 bar) and 140 K =

$$130.2 + \left[\frac{(14.8 - 10)}{20 - 10} * (118.5 - 130.2)\right] = 124.6 \frac{kJ}{kg}$$

Entropy at 214.7 psia (14.8 bar) and 120 K =

$$5.214 + \left[\frac{(14.8 - 10)}{20 - 10} * (4.882 - 5.214)\right] = 5.055 \frac{kJ}{kg * K}$$

Entropy at 214.7 psia (14.8 bar) and 140 K =

$$5.398 + \left[\frac{(14.8 - 10)}{20 - 10} * (5.140 - 5.398)\right] = 5.274 \frac{kJ}{kg * K}$$

Temperature at 214.7 psia where Entropy is 5.136 =

$$5.055 + \left[\frac{(X - 120)}{140 - 120} * (5.274 - 5.055)\right] = 5.136 \frac{kJ}{kg * K}$$

$X = 127.4 \text{ K}$

Enthalpy at 214.7 psia (14.8 bar) and 127.4 K =

$$96.1 + \left[\frac{(127.4 - 120)}{140 - 120} * (124.6 - 96.1)\right] = 106.6 \frac{kJ}{kg}$$

Calculated Total Energy Extracted by Expanding Air at 3333 Psig (230.8 Bar) to 200 Psig (14.8 Bar)

$$h_1 = 247.8 \frac{kJ}{kg}$$

and $$h_2 = 106.6 \frac{kJ}{kg}$$

$$E = m_{air}(h_1 - h_2)$$

$$E = 10545.45 \text{ kg} * \left(141.2 \frac{kJ}{kg}\right) = 1489018 \text{ kJ} = 1489.0 \text{ MJ}$$

Estimated Expected Electrical Output

There are multiple ways to use the energy of the compressed air effectively, but a common way is to convert the energy to electricity in a turbine by expanding through a turbine that drives an electrical generator. A calculation was made by assuming a reasonable value for the overall electrical generation efficiency of 33%.

Electric Output =

$$n_{electric} * Energy_{in} = 0.33 * 1489.0 \text{ MJ} * \frac{1}{3600} \frac{hr}{sec} = 136.5 \text{ kwh}$$

Table 3 below provides a listing of typical post accident loads that may be powered by the generation systems and methods of the invention. It is shown from the electric output which is available and these loads that several hours of additional coping time may be provided during a loss of AC power scenario.

TABLE 3

| Item No. | Description of Loads | Ancillary AC Generator 1 Load (kW) | Ancillary AC Generator 2 Load (kW) |
| --- | --- | --- | --- |
| 1. | Post-Accident Monitoring (PAM) Emergency and Panel Lighting (Division B) in Main Control Room and ancillary fans | | 6.5 |
| 2. | Post-Accident Monitoring (PAM) Emergency and Panel Lighting (Division C) in Main Control Room and ancillary fans | 6.5 | |
| 3. | PCS Recirculation Pumps | 19.3 | 19.3 |
| 4. | Ancillary Generator Room Lights | 0.5 | 0.5 |
| 5. | Ancillary Generator Fuel Tank Heater | 1.25 kW | 1.25 kW |
| | Total | 27.55 kW | 27.55 kW |

Example 2

Downstream of the pressure regulator, the compressed air was expected to be 120 psig, with a flowrate of 65±5 SCFM. The inlet eductor pressure was 110 psig, which did not allow for much opportunity to extract useful energy from the compressed air stream downstream of the pressure regulator. However, if the eductor inlet pressure was decreased to ~95 psig, another potential use of the compressed air was investigated. Instead of extracting energy and generating electricity, the relatively lower air pressure was used to power a pneumatic device, e.g., an air-operated diaphragm pump.

A representative pump curve is shown in FIG. 5. Using FIG. 5, 65 SCFM of 120 psig pressure inlet air provided approximately 40 gpm of water at a discharge head of approximately 225 feet. The air outlet pressure was >95 psig.

Potential Water Transfer

The VES operated for a minimum of 72 hours.

$$\text{Water pumped} = 40 \text{ gpm} * 60 \text{ min/hr} * 72 \text{ hr}$$
$$= 172,800 \text{ gallons}.$$

The total amount of energy contained in the compressed air tanks was found to be 2613.2 MJ. Adibatic, isentropic expansion from the expected operating pressure to the design pressure of the pressure regulator had the ability to yield 1489.0 MJ. Assuming an overall electrical generation of 33%, 136.5 kwh of electricity was expected from a compressed air turbine system. In addition, an air-operated diaphragm pump located downstream of the pressure regulator had the potential to deliver 172,800 gallons of water at a discharge head of ~225 feet using a representative pump curve.

While the invention has been described in terms of various specific embodiments, those skilled in the art will recognize that the invention can be practiced with modifications within the spirit and scope of the appended claims.

The invention claimed is:

1. A passive main control room habitability system in a nuclear reactor power plant having a generation system for converting stored energy of compressed air into electrical power when the main control room habitability system is activated during a loss of all AC power scenario comprising:
   at least one tank for storing the compressed air;
   a pressure regulator located downstream of the at least one tank and connected thereto to receive and to reduce pressure of the compressed air to produce lower pressure compressed air;
   an air-driven mechanism located downstream of the pressure regulator and connected thereto to receive and expand the lower pressure compressed air;
   an eductor located downstream of the air-driven mechanism; and
   piping to connect the tank, pressure regulator, air-driven mechanism and eductor,
   wherein, the lower pressure compressed air corresponds to an inlet pressure of the air-driven mechanism and wherein, the air-driven mechanism is structured to provide at least one function selected from converting said lower pressure compressed air into the electrical power and providing the lower pressure compressed air to the eductor to receive and distribute air into a control room of the nuclear reactor power plant.

2. The passive main control room habitability system of claim 1 wherein the mechanism comprises an air-driven turbine and a generator.

3. The passive main control room habitability system of claim 1 wherein the mechanism comprises an air-driven pump.

4. The passive main control room habitability system of claim 1 wherein the mechanism compresses an air-driven turbine, generator, and air-driven pump.

5. The passive main control room habitability system of claim 1 wherein the maximum pressure of the compressed air in the at least one tank is about 4000 psi.

6. The passive main control room habitability system of claim 1 wherein the minimum pressure in the at least one tank is about 3333 psi.

7. The passive main control room habitability system of claim 1 wherein the stream of lower pressure compressed air is about 120 psi.

8. The passive main control room habitability system of claim 3 wherein a pressure differential of 25 psi between the stream of lower pressure compressed air and design pressure of the eductor is used to operate the pneumatic pump.

9. A method of generating electrical power by converting stored energy of compressed air in an activated, passive main control room habitability system in a nuclear reactor power plant during a loss of all AC power scenario, comprising:
   pressurizing the compressed air in at least one storage tank;
   passing the compressed air through a pressure regulator located downstream of the at least one tank and connected thereto for receiving and for reducing the pressure of the compressed air, and for producing lower pressure compressed air;
   delivering the lower pressure compressed air to an air-driven mechanism located downstream of the pressure regulator and connected thereto for receiving and expanding the lower pressure compressed air, which corresponds to an inlet pressure of the air-driven mechanism, and for providing at least one function selected from converting said lower pressure compressed air into the electrical power and providing the lower pressure compressed air to an eductor for receiving and distributing air into a control room of the nuclear reactor power plant.

10. The method of claim 9 wherein the mechanism comprises a turbine and a generator.

11. The method of claim 9 wherein the mechanism comprises an air-driven pump.

12. The method of claim 9, wherein the mechanism comprises a turbine, a generator, and an air-driven pump.

* * * * *